Oct. 11, 1949.    M. SPEN    2,484,429
TRAILER DRAFT MEMBER AND SUPPORT
Filed June 30, 1947
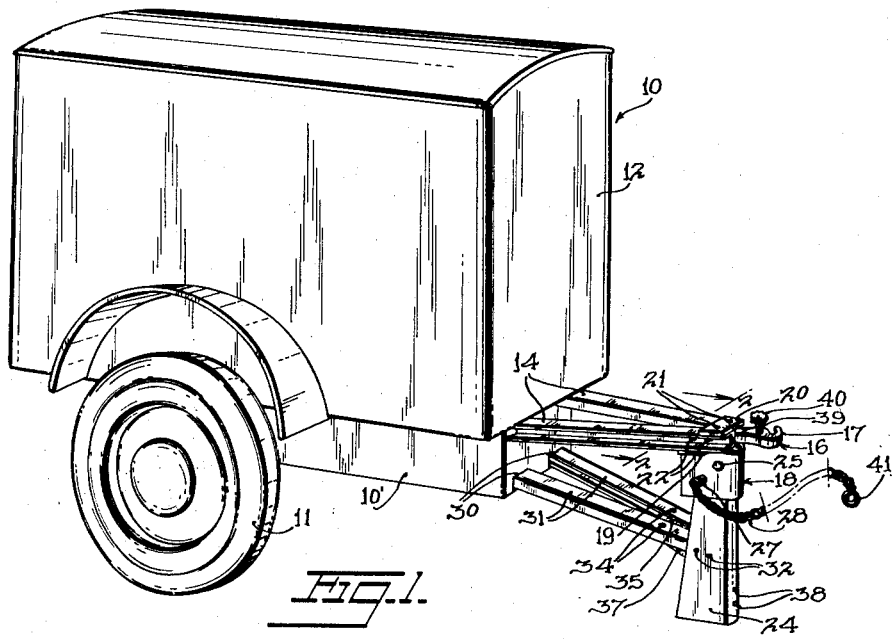
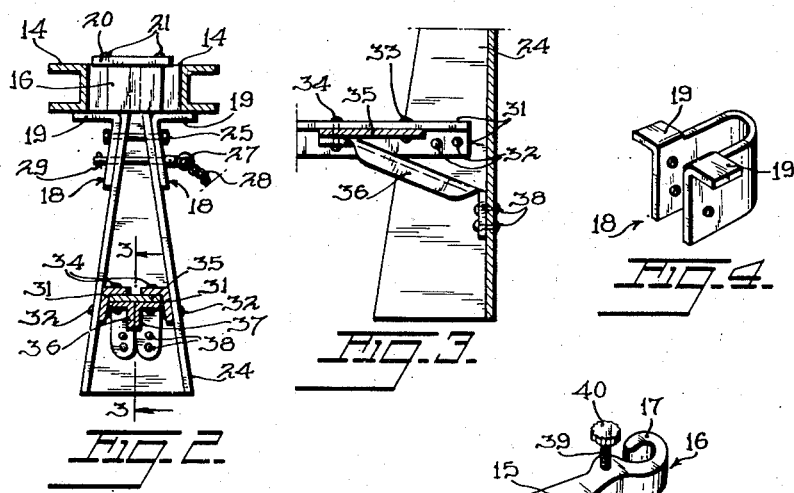
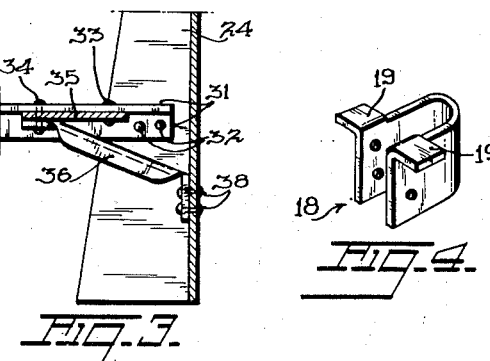
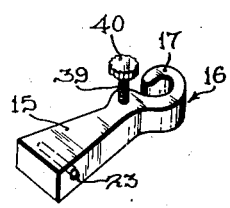
Inventor
MONROE SPEN
By
Attorney Patented Oct. 11, 1949

2,484,429

UNITED STATES PATENT OFFICE 2,484,429

TRAILER DRAFT MEMBER AND SUPPORT

Monroe Spen, Brooklyn, N. Y.

Application June 30, 1947, Serial No. 758,038

8 Claims. (Cl. 280—33.4)

This invention relates to new and useful improvements in trailers.

More particularly, the present invention relates to a novel and improved structure to be secured to and carried at the forward end of a trailer, for attaching the latter to the rear of a motor car or other automotive vehicle for transport of the trailer.

A feature of the invention is the provision of such a structure, characterized by very light weight, ease of manufacture, ruggedness in service, superior behavior in use, and low cost to produce.

The new structure is essentially a skeletal one, made of standard structural shapes, plus the addition of a very few formed sheets, and with these last capable of being made from comparatively simple and inexpensive press dies.

Another feature of the invention is the provision of a structure as just indicated, for a two-wheeled trailer, and in which structure is included a depending post element which rests on the ground to hold the bottom of the trailer body against excessive tilt away from the wheel support when the trailer is not moving, as when the same is out of service because it is detached from the pulling vehicle, or when the latter with the trailer attached stops. In this last connection, a connector means is used between the new structure and the pulling vehicle, and which functions to lift said post from the ground the moment the pulling vehicle is put into motion.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front perspective view of a two-wheeled trailer van, with a now prefered embodiment of the new structure carried thereby.

Fig. 2 is a transverse vertical section taken on the line 2—2 of Fig. 1.

Fig. 3 is a longitudinal vertical section taken on the line 3—3 of Fig. 2.

Fig. 4 is a detail perspective view showing one formed sheet member, detached.

Fig. 5 is a similar view showing a hook carrying member for facilitating anchorage of a chain or other flexible connection between the forward end of the new structure and a rear portion of the pulling vehicle.

The trailer 10 has a pair of wheels, one of which is shown at 11, and is illustrated as the commercial or merchandise carrying type. This form of trailer commonly has a closed body 12, as here shown; and so may be provided with a rear door having a lock.

Included in the new structure are a pair of channel members 14, suitably secured at their rear ends to the bottom of the body 12. These channels extend horizontally and convergingly forward, for receiving snugly between them the rearwardly flared rear portion 15 of a hook carrying member 16, the hook of which is marked 17.

Below the forward ends of the channels 14 there is a U-shaped cuff member 18, the same being one of the formed sheets aforesaid. The cuff 18 integrally includes at its top a pair of horizontally oppositely offset wings 19.

The forward ends of the channels 14 rest on said wings, and the latter are secured as by welding to the bottom flanges of the channels. A gusset plate 20 is secured, as by rivets 21, to the top flanges of the channels. Also, a pair of bolts 22 are applied horizontally through the webs of the channels, the forward one of said bolts going through a hole 23 in the rear portion 15 of the hook member 16, see Fig. 5.

The aforesaid post is shown at 24, this being constituted by the other of the aforesaid formed sheets. The post 24 is shaped so as in horizontal section from top to bottom to define a U. The interior of this U, like that of the cuff 17, has its mouth facing rearwardly; and the post downwardly flares both laterally and in a fore and aft direction.

The upper end of the post 24 is shaped to fit snugly inside the cuff 18, and these parts are secured together by a bolt 25 and a shouldered pin 26, the latter carrying at its enlarged end an eye 27, to which one end of a chain 28 is attached; this pin at its other end being held in place and restrained against axial shift by a cotter pin 29.

With the parts arranged and connected as so far described, and with the coupling bolts and the like tightly drawn up, and with the channels 14 at their rear end portions which are hidden in Fig. 1 extended well under the body 12 and secured thereto at a plurality of points along such hidden channel portions, the horizontal V-frame provided by the channels 14 is rigid in itself and rigidly dependent from the end of said V-frame.

For extra staying of the foot of the post 24 certain additions are provided which will now be described.

The body 12 is shown as having an underbody 10', the interior of which is desirably present, especially in a merchandise handling trailer, for increasing the bulk carrying capacity of the trailer. Through openings 30 in the front wall of said underbody extend substantially horizontal forwardly converging angle irons 31, with their hidden lengths, inside the underbody, suitably attached to the floor of the latter. Said angle irons, near their forward ends, at their vertical flanges, are secured as by bolts 32 to the side wall portions of the post 24, against the inside surfaces of said wall portions.

The forward ends of the angle irons 31, at the under sides of their horizontal flanges, are further coupled by a gusset plate 35, by way of rivets as indicated at 33 and 34.

The rivets 34 also serve to attach the rear ends of a pair of angle iron struts 36 and 37, at the horizontal flanges of the latter, where their vertical flanges are cut away as shown in Fig. 3. These struts extend forwardly downward, along lengths thereof retaining their vertical flanges. Said struts at their forward ends, where their vertical flanges are cut away, are bent downward to lie against the inner surfaces of the front wall portion of post 24, and are there riveted to said post, as at 38.

In the top of the member 16 in rear of its hook 17 is threadedly mounted a screw 39 having an enlarged and scalloped head 40.

The chain 28, after being engaged with some selected rear portion of the pulling vehicle, is brought back and attached at the terminal ring 41 of the chain to the hook 17, after the chain has been wound several times around the screw 39, so that when the screw 39 is turned down tightly, its head 40 clamps down on the chain portions therebelow. Before this connection of the chain to the screw and hook, the chain, which is desirably rather long, is looped back and forth between some selected part of the pulling vehicle and the back of the post 24, with the only such loop, or at least one of several such loops, passing under the forward ends of the angle irons 31. With this or some equivalent connection between the new structure on the trailer and the pulling vehicle, the moment the latter starts moving, upward pull by the chain will lift the foot of the post off the ground, without scraping, and during any forward movement of the pulling vehicle the post will be held off the ground; but the moment the vehicle stops, the trailer will drop forward slightly to rest squarely on its two wheels and the post.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook.

2. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, said means securing together the front ends of said channel members comprises a pair of bolts extended through the front ends of said channel members.

3. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, said means securing together the front ends of said channel members comprises a pair of bolts extended through the front ends of said channel members, one of said bolts being passed through a hole formed laterally through the flared rear end of said hook anchoring the same against longitudinal movement relative to said channel members.

4. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, said post being flared from top to bottom both from side to side and from front to rear.

5. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, and means securing the top end of said post in position within said cuff members.

6. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, and means securing the top end of said post in position within said cuff member, said post securing means comprises a bolt extended through said cuff member and said post, and a shouldered pin extended through said cuff member and said post and having its enlarged end disposed on one side of said cuff member and its end at the other side of said cuff member anchored by a cotter pin.

7. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, and means securing the top end of said post in position within said cuff member, said post securing means comprises a bolt extended through said cuff member and said post, and a shouldered pin extended through said cuff member and said post and having its enlarged end disposed on one side of said cuff member and its end at the other side of said cuff member anchored by a cotter pin, and an eye formed on the enlarged end of said shouldered pin, a chain having one end attached to said eye to have its intermediate portion engaged with a selected rear portion of a pulling vehicle, and a terminal ring on the free end of said chain engageable with said hook.

8. In combination with a trailer, a pair of channel members having their open sides faced outwards and their rear ends attached to the trailer, said channel members having their front ends converging toward each other, a hook having a rearwardly flared portion engaged between the front ends of said channel members, means securing the front ends of said channel members together against the sides of said rearwardly flared portion of said hook, a U-shaped cuff member secured to the bottom faces of the front ends of said channel members and having its open side facing rearwards, a vertical U-shaped post having its open side facing rearwards and its top end engaged within said U-shaped cuff member, a pair of substantially horizontal angle irons secured at their rear ends to the trailer and having their front ends converging towards each other and extended into the open rear side of said post intermediate of the top and bottom ends thereof, means securing the front ends of said angle irons to said post, and a gusset secured to the top faces of the front ends of said channel members and cooperating with said channel members and said cuff member to enclose the flared rear end of said hook, a screw threaded into said hook at the front end of the rearwardly flared portion thereof, and an enlarged head mounted on the top end of said screw.

MONROE SPEN.

REFERENCES CITED

The following references are of record in the file of this patent:

UNITED STATES PATENTS

| Number | Name | Date |
|---|---|---|
| 1,727,430 | Gilkison | Sept. 10, 1929 |
| 1,920,571 | Kuchar | Aug. 1, 1933 |
| 2,400,145 | Zink et al. | May 14, 1946 |

FOREIGN PATENTS

| Number | Country | Date |
|---|---|---|
| 155,648 | Switzerland | Sept. 16, 1932 |
| 334,329 | Great Britain | Sept. 4, 1930 |